United States Patent [19]

Smith

[11] Patent Number: 5,110,327
[45] Date of Patent: May 5, 1992

[54] COMPRESSED AIR DRYER

[75] Inventor: Gregory C. Smith, Elyria, Ohio

[73] Assignee: Allied-Signal Inc., Morristown, N.J.

[21] Appl. No.: 763,095

[22] Filed: Sep. 20, 1991

[51] Int. Cl.$^5$ ........................................... B01D 53/04
[52] U.S. Cl. ........................................... 55/163; 55/33; 55/316
[58] Field of Search ................. 55/162, 163, 271, 316, 55/387, 21, 33

[56]  References Cited

U.S. PATENT DOCUMENTS

| | | |
|---|---|---|
| 2,556,292 | 6/1951 | Newcum . |
| 3,001,605 | 9/1961 | Hill . |
| 3,080,977 | 3/1963 | Jones . |
| 3,434,599 | 3/1969 | Wischmeyer et al. . |
| 3,593,498 | 7/1971 | Semon . |
| 3,714,763 | 2/1973 | Suzuki ................................. 55/163 |
| 4,043,774 | 8/1977 | McGrath . |
| 4,259,097 | 3/1981 | Patel et al. . |
| 4,543,112 | 9/1985 | Ackley et al. . |

Primary Examiner—Charles Hart
Attorney, Agent, or Firm—Ken C. Decker; William N. Antonis

[57] ABSTRACT

A compressed air dryer includes a base and a "spin-on" desiccant cannister which is retained on the base through a threaded connection. Accordingly, when the desiccant within the cannister which drys the air must be replaced, the cannister is removed from the housing by rotating the cannister relative to the housing, and is replaced accordingly by a new cannister.

14 Claims, 1 Drawing Sheet

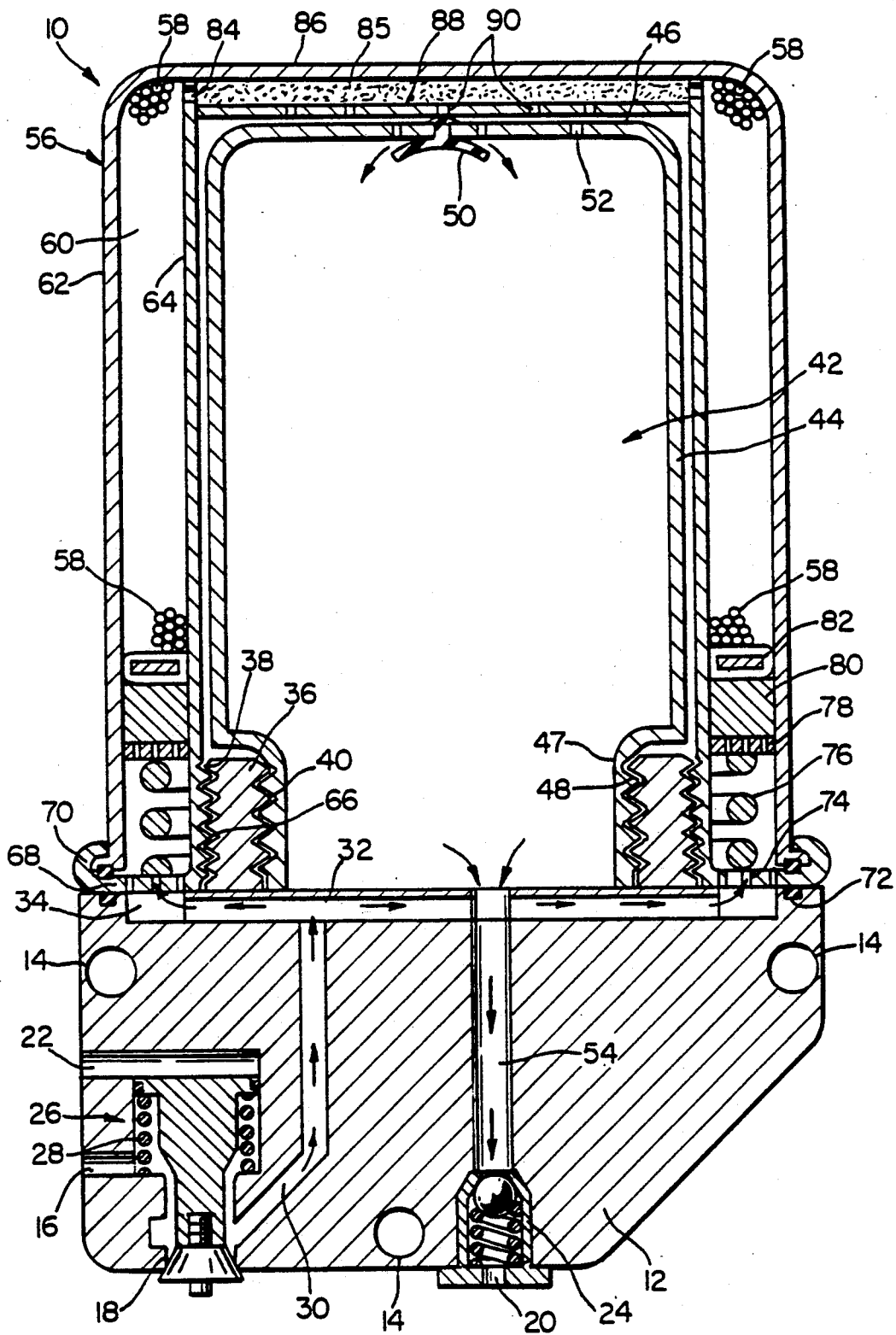

COMPRESSED AIR DRYER

This invention relates to an air dryer for a compressed air braking system.

Heavy duty vehicles, such as trucks and buses, are commonly equipped with a braking system in which the brakes are actuated by compressed air. Moisture entrained in the compressed air can cause significant problems. For this reason, it has become common to provide a compressed air dryer in such compressed air braking systems to remove the moisture entrained in the compressed air. Such air dryers include a desiccant material which adsorbs moisture. The desiccant is periodically regenerated when the compressor which generates the compressed air goes off load. However, the desiccant must be replaced periodically, as it eventually can no longer be regenerated effectively. Accordingly, air dryers require periodic service, including the replacement of the desiccant. Most air brake system air dryers in use today also include an integral purge volume, in which a quantity of compressed air dried by the air dryer is kept segregated and is used to regenerate the desiccant. These air dryers require almost a complete disassembly of the air dryer in order to replace the desiccant, which can be quite time consuming.

The present invention solves the aforementioned problems by providing an air dryer with a desiccant cannister which surrounds the purge volume. The cannister is connected to the dryer base by a threaded connection, so that cannister can be removed and replaced by merely "spinning off" the old cannister and "spinning on" the new cannister. Since the cannister surrounds the purge volume, the air dryer is relatively compact.

These and other advantages of the present invention will become apparent from the following description, with reference to the accompanying drawings, the sole FIG. of which is a longitudinal cross-sectional view of an air dryer made pursuant to the teachings of the present invention.

Referring now to the drawing, an air dryer generally indicated by the numeral 10 includes a base 12 having mounting holes 14 for attachment to the frame of the vehicle on which the air dryer 10 is to be used. The base 12 defines an inlet or supply port 16, an exhaust port 18, an outlet or delivery port 20, and a control port 22. A check valve 24 permits communication out of the outlet or delivery port 20, but prevents communication in the reverse direction. A combination inlet and exhaust valve generally indicated by numeral 26 is responsive to pressure at control port 22 for controlling communication through the supply port 16 and the exhaust port 18. When pressure at the control port is vented, spring 28 urges the valve 26 into the position illustrated in the drawing, closing off exhaust port 18 and communicating supply port 16 with passage 30 defined within the base 12. When a pressure signal is received at control port 22, the inlet and exhaust valve 26 is urged downwardly, closing off the supply port 16 and opening the exhaust port 18. The valve 26 is more completely disclosed in U.S. Pat. No. 4,955,994.

The passage 30 communicates with transverse passages 32 which communicate the passage 30 with a circumferentially extending groove 34 on the upper surface of the base 12. Base 12 further includes a circumferentially extending, axially projecting flange 36 which carries grooves 38 on its outer circumferential surface and grooves 40 on its inner circumferential surface. A purge volume or compartment generally indicated by the numeral 42 is defined by circumferentially extending wall 44 and transverse wall 46. Purge air is stored in the purge volume or compartment 42 for later use for regeneration of the air dryer as will be hereinafter explained. A circumferentially extending wall 44 terminates in an offset portion 47 which is provided with threads 48 which engage the threads 40 when the purge volume is installed on the base 12. A one-way check valve 50 and purge orifice 52 are carried in the transverse wall 46, and the function of which will be hereinafter explained. A passage 54, which is circumscribed by groove 34, communicates the purge volume or compartment 42 with check valve 24 and outlet or delivery port 20.

A desiccant cannister generally indicated by the numeral 56 includes desiccant beads 58 which are contained within an annular chamber 60 defined between an outer circumferential wall 62 and an inner circumferential wall 64. The lower portion (viewing the FIG.) of inner circumferential wall 64 is provided with threads 66 which engage the threads 38 on flange 36 when the desiccant cannister 56 is installed on the base 12. A transversely extending, annular closure wall 68 closes the lower end of the annular chamber 60 and is crimped to the outer wall 62 as at 70. A circumferentially extending seal 72 circumscribes the groove 34 and sealingly engages the closure wall 68. Circumferentially spaced apertures 74 communicate the air to be dried from the groove 34 into the annular chamber 60. Although the purge compartment or volume 42 is illustrated as a separate container, the hollow inner diameter of the cannister 56 could be used to define the purge volume, thereby eliminating the separate container.

Air entering the annular chamber 60 passes around a circumferentially extending coiled spring 76 which extends around the annular chamber 60 and circumscribes the purge volume 42. Spring 76 bears against a porous annular member 78, which transmits the force of the spring 76 through an annular, conventional, crushed aluminum oil separating member 80. Another porous annular member 82 separates the crushed aluminum oil separator 80 from the desiccant beads 58. Both the members 78 and 82 are porous to permit communication of air to be dried therethrough. Accordingly, the force of spring 76 is transmitted through members 78, 80, and 82 to provide a compacting force on the beads 58. It has been found in prior art air dryers that the beads 58 must have a compacting force applied to them in order for them to be most efficient. A porous member 85 is mounted in the chamber defined between transversely extending outer wall 86, which extends across the entire upper end (viewing the FIG.) of the cannister 56 and transversely extending inner wall 88 which bridges the upper end of inner circumferential wall 64. Inner walls 64, 88 are provided with apertures 84, 90 to permit air to communicate from the desiccant to pass to the purge volume or chamber 42 through the check valve 50.

In operation, air is communicated through supply port 16 and passes to passage 30, it being assumed that the valve 26 is in the position illustrated in which the exhaust 18 is closed. Air in passage 30 is communicated into the groove 34 through passage 32 and passes through apertures 74 into the annular chamber 60. Oil entrained in the air is removed by the oil separating member 80, and moisture is removed from the air by the desiccant beads 58. The air then passes through aperture 84 and the chamber defined between the walls 86 and 88, and then passes through openings 90 and through check valve 50 into the purge volume or compartment 42. Compressed air is then communicated out of the purge volume or compartment 42 through the passage 54 and check valve 24 to the delivery port 20, and from there to a storage reservoir (not shown).

When the vehicle air compressor (not shown) which generates the compressed air which is dried by the air dryer 10 comes off load, a pressure signal is communicated to control port 22 in the conventional manner. Pressure at control port 22 acts against the valve 26 to close off supply port 16 and open exhaust port 18 to atmosphere. Accordingly, passages 30, 32, groove 34 and the annular chamber 60 are reduced to atmospheric pressure, causing the compressed air stored in the purge volume or chamber 42 to backflow through flow restricting orifice 52 into the volume 60 and eventually back through the passages 32 and 30 to the exhaust port 18. The purge orifice 52 limits flow to a predetermined rate, and purging continues until the pressure level in purge volume or compartment 42 is reduced to nearly atmospheric pressure or until the signal control port 22 terminates, whichever first occurs. Compressed air is prevented from backflowing into the purge volume 42 through the delivery or outlet port 20 by the check valve 24. The air dryer 10 is cycled as described above between drying and regeneration cycles depending upon whether the compressor is on or off load.

Although the desiccant can be purged an indefinite number of times, it eventually can no longer efficiently dry compressed air. At this time, the desiccant must be replaced. According to the invention, the cannister 56 is "spun off" the base 12 by simply rotating the cannister relative to the base, so that the threaded connection between threads 38 and 48 are unscrewed. A new cannister 56 can then be installed by reversing the process. The cannister containing the depleted desiccant can then be returned to the factory or rebuilder, which can replace the desiccant with new desiccant so that the cannister may be reused an indefinite number of times. Accordingly, none of the other components of the base or the purge volume or compartment 42 need be displaced when the desiccant is changed. Therefore, changing the desiccant is reduced to a relatively simple procedure requiring only seconds, instead of in prior art air dryers where much of the air dryer had to be disassembled in order to replace the desiccant.

I claim:

1. Compressed air dryer comprising a base having an inlet communicated to a compressed air source, an outlet communicated to a storage reservoir, and exhaust, and valve means responsive to a control signal for opening and closing said exhaust; means for securing a desiccant canister to said base; said desiccant canister including circumferentially extending inner and outer walls defining an annular chamber therebetween; a desiccant in said annular chamber, a transversely extending end wall closing one end of annular chamber; means for securing the other end of said annular chamber to said base; said inner wall, said transversely extending wall, and said base defining a purge compartment within said desiccant canister for storing purge air for periodic backflowing through the desiccant for regeneration of the latter whereby said purge volume is defined within said desiccant canister; said base extending across the other end of said desiccant canister and purge compartment; and a flowpath defined by said base, said desiccant canister, and said purge compartment for communicating compressed air from said inlet to said outlet.

2. Compressed air dryer as claimed in claim 1, wherein said securing means includes cooperating manually releasable means carried by said cannister and by said base to permit removal of the cannister from the base without disassembly of the base.

3. Compressed air dryer as claimed in claim 2, wherein said releasable means includes a threaded connection permitting said canister to be removed from the base by rotating the cannister relative to the base.

4. Compressed air dryer as claimed in claim 3, wherein said threaded connection includes threads carried on said inner wall and on said base.

5. Compressed air dryer as claimed in claim 1, wherein said purge compartment is defined by wall means within the inner wall of the desiccant canister, said securing means includes cooperating manually releasable means carried by said cannister and by said base to permit removal of the cannister from the base without removal of the wall means defining the purge compartment.

6. Compressed air dryer as claimed in claim 1, wherein said cannister includes a transversely extending annular closure wall closing the end of the annular chamber opposite the end closed by said end wall, said closure wall engaging said base when the cannister is installed on said base, and passage means extending through said base and said closure wall for communicating compressed air to said chamber.

7. Compressed air dryer as claimed in claim 6, wherein said base includes an engagement surface engaging said closure wall and said passage means includes a circumferentially extending section defined within said engagement surface for feeding compressed air into said annular chamber, said closure wall having circumferentially spaced apertures registering with said circumferentially extending section.

8. Compressed air dryer as claimed in claim 7, wherein said circumferentially extending section circumscribes an outlet passage defined within said base communicating said purge compartment with said outlet.

9. Compressed air dryer as claimed in claim 1, wherein said transversely extending end wall extends across said purge compartment, said purge compartment being defined by wall means within the inner wall of the desiccant canister, and a flow path defined between said wall means of the purge compartment and said end wall directed said compressed air radially inwardly from said annular chamber into said purge volume.

10. Compressed air dryer as claimed in claim 9, wherein said cannister includes a transversely extending annular closure wall closing the end of the annular chamber opposite the end closed by said end wall, said closure wall engaging said base when the cannister is installed on said base, and passage means extending through said base and said closure wall for communicating compressed air to said chamber.

11. Compressed air dryer as claimed in claim 10, wherein said base includes an engagement surface engaging said closure wall and said passage means includes a circumferentially extending section defined within said engagement surface for feeding compressed air into said annular chamber, said closure wall having circumferentially spaced apertures registering with said circumferentially extending section.

12. Compressed air dryer as claimed in claim 9, wherein said releasable means includes a threaded connection permitting said canister to be removed from the base by rotating the cannister relative to the base.

13. Compressed air dryer as claimed in claim 1, wherein spring means within said annular chamber yieldably urges said desiccant within said annular chamber away from said base.

14. Compressed air dryer as claimed in claim 13, wherein said spring means is a coiled spring within said annular chamber circumscribing said purge compartment.

* * * * *